US012597062B1

(12) United States Patent
Bagotra et al.

(10) Patent No.: US 12,597,062 B1
(45) Date of Patent: Apr. 7, 2026

(54) REAL TIME COMMUNICATION IN A VIRTUAL ENVIRONMENT

(71) Applicant: Meta Platforms, Inc., Menlo Park, CA (US)

(72) Inventors: Ankush Bagotra, Milpitas, CA (US); Shreyas Narendra Basarge, Mountain View, CA (US); Saeed Jahed, Seattle, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 421 days.

(21) Appl. No.: 18/133,371

(22) Filed: Apr. 11, 2023

(51) Int. Cl.
| | |
|---|---|
| *G06Q 30/00* | (2023.01) |
| *G06Q 20/10* | (2012.01) |
| *G06Q 20/12* | (2012.01) |
| *G06Q 20/38* | (2012.01) |
| *G06Q 30/0601* | (2023.01) |
| *G06T 17/00* | (2006.01) |

(52) U.S. Cl.
CPC ....... *G06Q 30/0643* (2013.01); *G06Q 20/108* (2013.01); *G06Q 20/123* (2013.01); *G06Q 20/389* (2013.01); *G06T 17/00* (2013.01)

(58) Field of Classification Search
CPC ............. G06Q 30/0643; G06Q 20/108; G06Q 20/123; G06Q 20/389; G06Q 30/0641; G06Q 30/06431; G06Q 30/06432; G06Q 30/06433; G06Q 30/06434; G06Q 30/06435; G06Q 30/0644; G06Q 30/06442; G06Q 30/06443; G06Q 30/06444; G06T 17/00

USPC ..................................................... 705/26, 27
See application file for complete search history.

(56) References Cited

U.S. PATENT DOCUMENTS

| | | | |
|---|---|---|---|
| 9,070,141 B2 | 6/2015 | Hua et al. | |
| 9,317,812 B2 | 4/2016 | Kabiljo et al. | |
| 10,395,321 B2 | 8/2019 | Shalita et al. | |
| 2012/0166532 A1 | 6/2012 | Juan et al. | |
| 2015/0012394 A1* | 1/2015 | Rossi ................. | G06Q 30/0643 |
| | | | 705/27.2 |

(Continued)

OTHER PUBLICATIONS

Shacklett et al., "WebRTC (Web Real-Time Communications)" techtarget.com, Oct. 21, 2021, 7pgs. (Year: 2021).*

(Continued)

*Primary Examiner* — Robert M Pond
(74) *Attorney, Agent, or Firm* — EVERSHEDS SUTHERLAND (US) LLP

(57) ABSTRACT

A method for real time communication in a virtual environment. The method includes presenting, in the virtual environment, a virtual payment object associated with a first user and a virtual payment processing object associated with a second user. The virtual payment object is associated with a real payment object. The virtual payment processing object is associated with a real payment processing service. Responsive to detecting an interaction in the virtual environment between the virtual payment object and the virtual payment processing object, data describing the real payment object is transmitted to the real payment processing service via a real time communication protocol, causing the real payment processing service to process a real payment from the real payment object to an account associated with the second user in near real time.

16 Claims, 9 Drawing Sheets

(56) References Cited

U.S. PATENT DOCUMENTS

2019/0180270 A1 * 6/2019 Ericson .............. G06Q 20/4014
2024/0297910 A1 * 9/2024 Shen .................... H04N 21/434

OTHER PUBLICATIONS

Menear: "VR, AR and the future of payments," FinTech Magazine, Jul. 10, 2020; 9pgs; (Year: 2020).*

* cited by examiner

Application Layer
540

Transport Layer
530

Internet Layer
520

410

Network Interface Layer
510

600

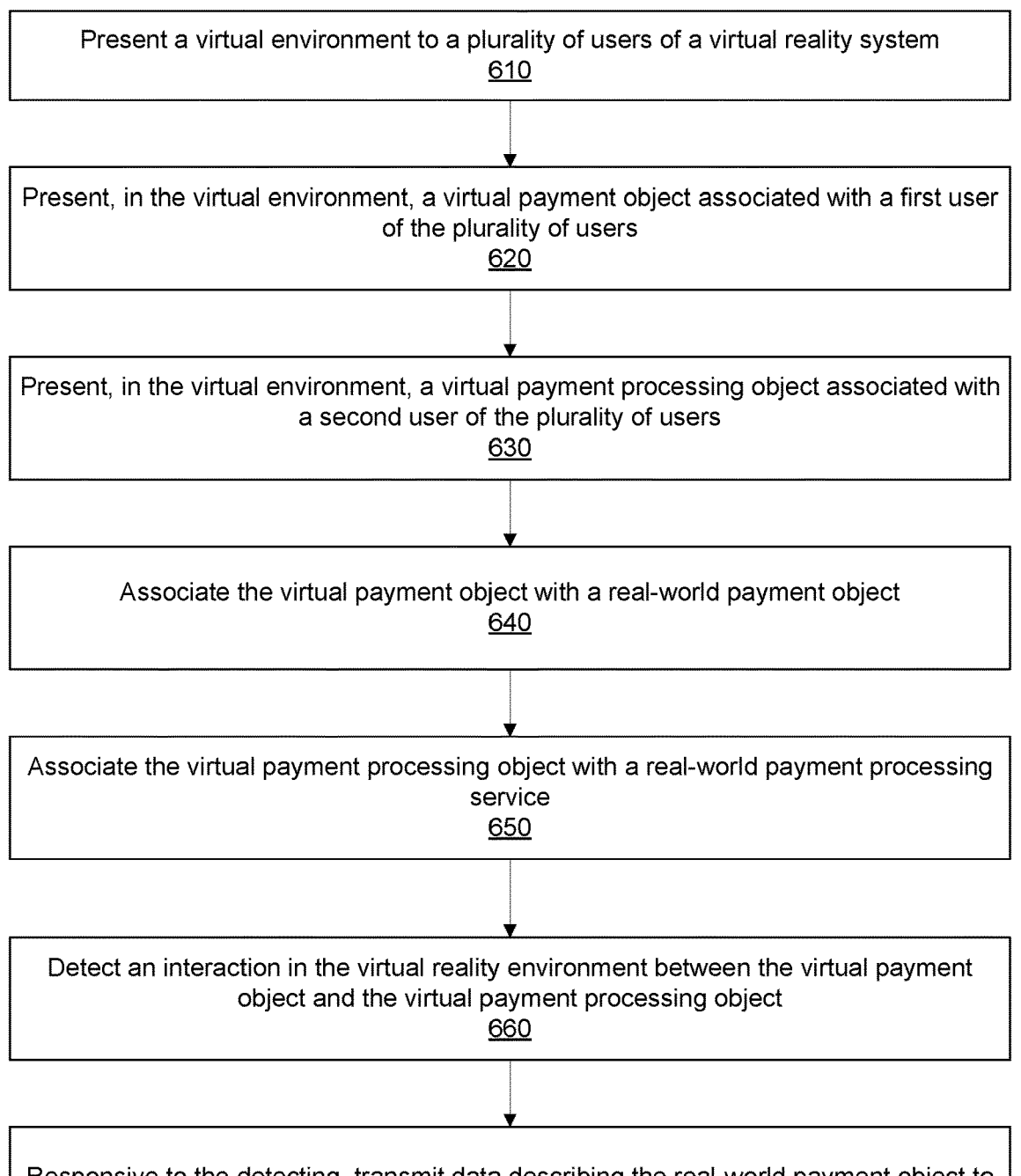

Present a virtual environment to a plurality of users of a virtual reality system
610

Present, in the virtual environment, a virtual payment object associated with a first user of the plurality of users
620

Present, in the virtual environment, a virtual payment processing object associated with a second user of the plurality of users
630

Associate the virtual payment object with a real-world payment object
640

Associate the virtual payment processing object with a real-world payment processing service
650

Detect an interaction in the virtual reality environment between the virtual payment object and the virtual payment processing object
660

Responsive to the detecting, transmit data describing the real-world payment object to the real-world payment processing service via a real time communication protocol, causing the real-world payment processing service to process a real payment from the real payment object to an account associated with the second user 670

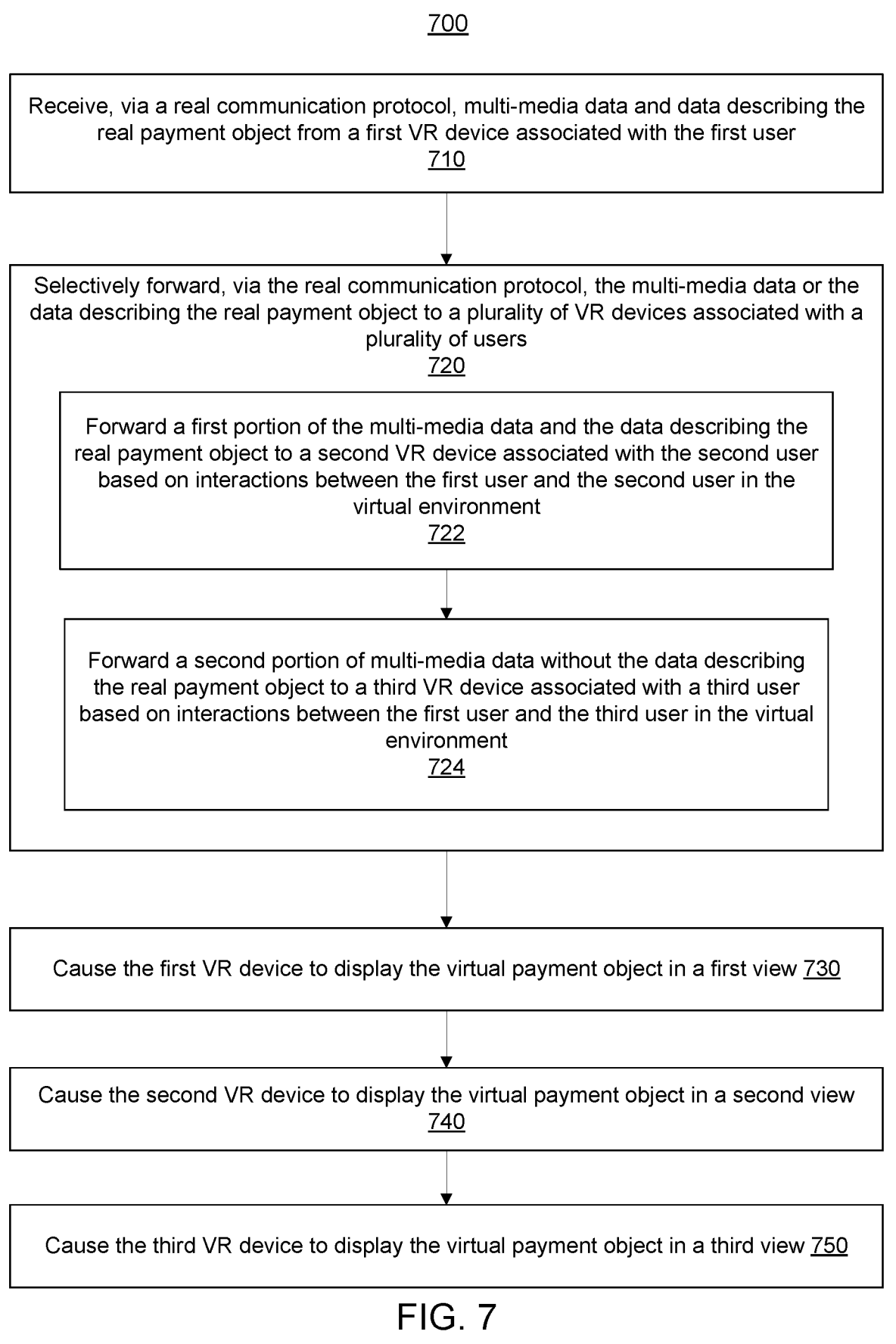

Receive, via a real communication protocol, multi-media data and data describing the real payment object from a first VR device associated with the first user
710

Selectively forward, via the real communication protocol, the multi-media data or the data describing the real payment object to a plurality of VR devices associated with a plurality of users
720

Forward a first portion of the multi-media data and the data describing the real payment object to a second VR device associated with the second user based on interactions between the first user and the second user in the virtual environment
722

Forward a second portion of multi-media data without the data describing the real payment object to a third VR device associated with a third user based on interactions between the first user and the third user in the virtual environment
724

Cause the first VR device to display the virtual payment object in a first view 730

Cause the second VR device to display the virtual payment object in a second view
740

Cause the third VR device to display the virtual payment object in a third view 750

FIG. 7

Headset
800

Frame
810

Audio
Controller
850

Tissue
Transducer
870

Speaker
860

Acoustic
Sensor
880

Illuminator
840

Position
Sensor
890

Display
Element
820

Imaging
Device
830

Headset
805

Band
875

Front Rigid Body
815

Illuminator
840

Imaging
Device
830

Position
Sensor
890

Audio
Controller
850

Acoustic Sensor
880

Speaker
860

REAL TIME COMMUNICATION IN A VIRTUAL ENVIRONMENT

BACKGROUND

Virtual reality (VR) is a simulated 3D environment that enables users to explore and interact with a virtual surrounding in a way that approximates reality, as it is perceived through the users' senses. The environment is created with computer hardware and software, although users might need to wear devices such as goggles, headsets, or handsets to experience or interact with the environment.

VR technology has come a long way in providing realistic sensory engagement and shows promise for business use in many industries. An VR environment can be non-immersive, semi-immersive, or fully immersive. The more deeply users can immerse themselves in a VR environment, and block out their physical surroundings, the more they are able to suspend their belief and accept it as real, even if it is fantastical in nature.

A fully immersive VR environment delivers the greatest level of virtual reality, completely immersing the user in the simulated 3D world. It incorporates sight, sound, and/or touch. Users wear special equipment, such as goggles, headsets, or handsets, allowing them to fully interact with the environment.

Collaborative VR is a type of virtual reality environment, in which users from same or different locations can come together in a virtual environment to interact with each other, with each individual represented by a virtual character. The users can communicate with each other through microphones, headsets, and/or handsets.

SUMMARY

In a virtual reality environment (also referred to as a virtual environment), users can shop for virtual objects, such as NFT or virtual clothes (like in a grocery store or shopping mall) and add the virtual objects into their bags and move to checkout with a virtual cashier. The payment is simulated like a real world event where the user hands over a virtual payment object (e.g., a virtual credit card) to the virtual cashier, and the virtual cashier performs an action with the virtual payment object and a virtual payment processing object (e.g., a virtual credit card reader).

The embodiments described herein allow the interaction between the virtual payment object and the virtual payment processing object to trigger a real payment in the real world. In some embodiments, the virtual objects correspond to real objects. In some embodiments, a virtual purchase transaction in the virtual environment maps to a real purchase transaction purchasing a real object in the real world.

However, it is technically challenging to make the real payment occur in near real time when the interaction in the virtual environment occurs. The embodiments described herein use a novel real time communication protocol or stack to reduce communication latency, to therefore improve user experience.

The embodiments relate to a method or a system that enables such near real time payment in response to interactions in a virtual environment. The system presents a virtual environment to a plurality of users of a virtual reality system. The virtual environment includes a virtual payment object associated with a first user and a virtual payment processing object associated with a second user. The virtual payment processing object is associated with a second user of the plurality of users. The system associates the virtual payment object with a real payment object, and associates the virtual payment processing object with a real payment processing service. Responsive to detecting an interaction in the virtual reality environment between the virtual payment object and the virtual payment processing object, the system transmit data describing the real payment object to the real payment processing service via a real time communication protocol, causing the real payment processing service to process a real payment from the real payment object associated with the first user to an account associated with the second user in near real time.

BRIEF DESCRIPTION OF THE DRAWINGS

FIG. 5 illustrates an example of a TCP/IP model including multiple layers, in accordance with one or more embodiments.

FIG. 6 is a flowchart of one embodiment of a method for selective real time communication in a virtual environment.

FIG. 7 is a flowchart of one embodiment of a method for transmitting data describing a real payment object to the real processing service via a real time communication protocol.

Figure 1:
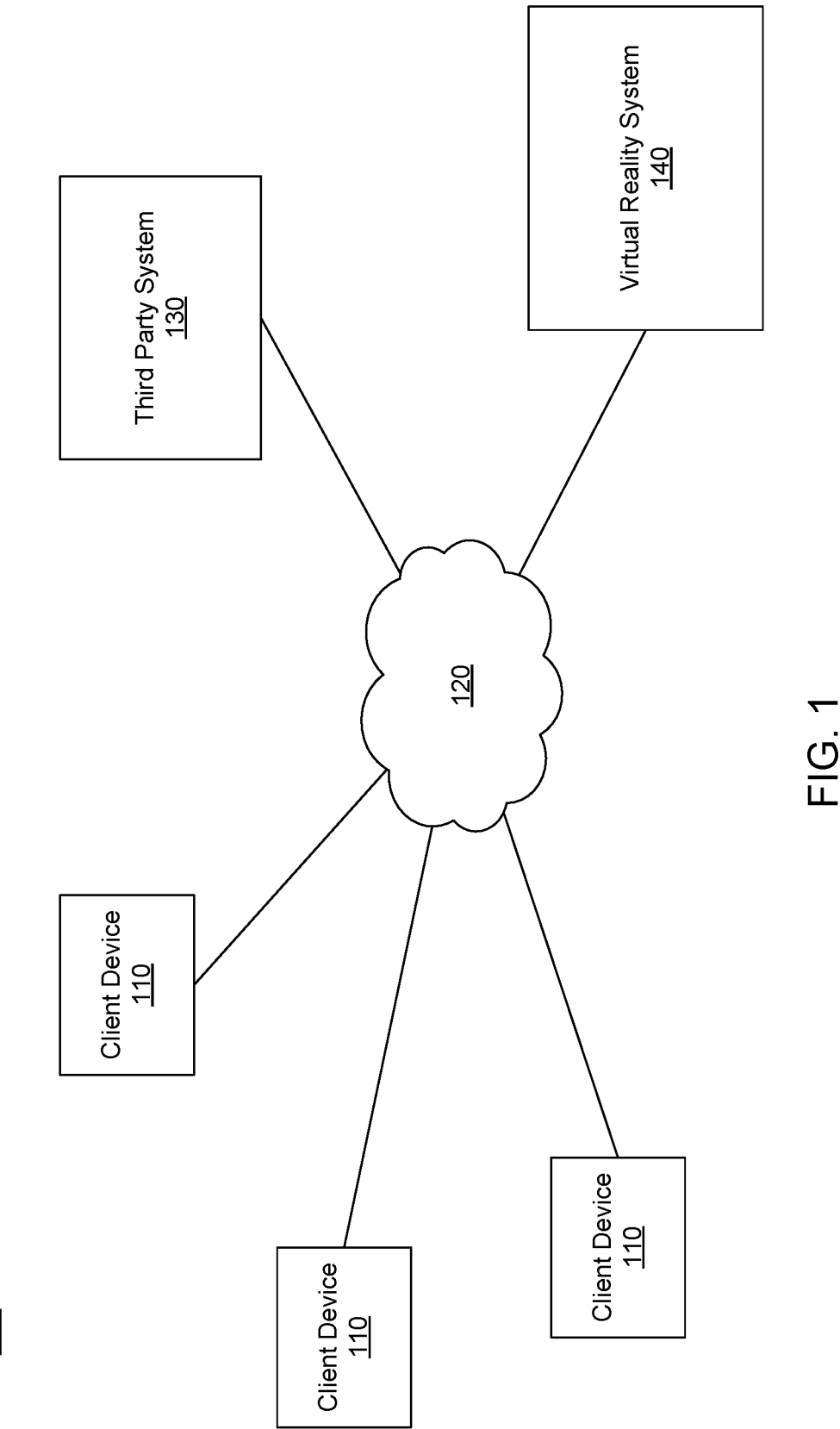
FIG. 1 is a block diagram of a system environment for an online system, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Traditionally e-commerce is a transactional system where users go online and add items to a cart and make payment. A more advanced version is shopping with a voice assistant system. The voice assistant system may be trained to understand certain fixed voice commands. Responsive to receiving a fixed voice command, the voice assistant system adds an item into a cart and checks out the item with a predefined payment method.

In a more immersive system, such as a virtual reality system, the shopping experience can be more realistic, just like shopping in the real world. A virtual reality environment may include a shopping mall or a store. A user in the virtual reality environment can view and pick up different items in the virtual store, and then finally select an item and go to a cashier and pay for the item using a virtual payment object. The virtual payment object (e.g., a virtual credit card) of the user is configured to interact with a virtual payment processing object (e.g., a virtual card processor) of the cashier to initiate a real payment. The entire shopping experience can be immersive and social as you talk to store staff, cashiers, family, and friends while doing commerce.

In embodiments, responsive to a virtual purchase transaction, a real purchase transaction occurs in the real world in near real time. To allow a real purchase transaction to occur, a real payment needs to be made from a buying user and a selling user. Also, to provide an immersive experience to users that simulates real shopping experience, such a real payment needs to be made in near real time when the virtual transaction occurs. For the real payment to occur, data describing a real payment object (e.g., credit card) of a first user (e.g., the buyer in the virtual environment) needs to be transmitted from a client device associated with the first user to a client device associated with a second user (e.g., the cashier in the virtual environment) with as little latency as possible. At the same time, because the data describing a real payment object includes sensitive information, such data should not be broadcasted to all the users in the virtual environment.

To solve the above-described technical challenges, the embodiments described herein enable data describing real payment objects to be handled via a novel real time communication (RTC) protocol. The RTC protocol is configured to transmit data describing a real payment object from a VR device associated with a buyer to an online system, which in turn selectively passes the real payment object to a VR device associated with a cashier. The VR device associated with the cashier can parse the data describing the real payment object to perform the real payment transaction.

In some embodiments, the RTC protocol is implemented in a particular layer of the computer network at is below an application layer to provide super low latency to simulate real world behavior. In some embodiments, each data packet in the particular layer includes a field indicating whether the data packet contains data describing a real payment object. The system selectively forwards the data packets containing data describing a real payment object to a VR device associated with a specific user, e.g., a cashier. In some embodiments, the system prioritizes the data packets containing data describing a real payment object over data packets containing multimedia data.

For example, in the virtual environment, a user and a friend may be shopping together in a virtual store. The user decides to purchase an item from the virtual store. The user has a virtual credit card, and hands the virtual credit card to a cashier, and the cashier swipes the virtual credit card at a virtual card processor. The friend observes this interaction in the virtual environment. In a parallel real world, in near real time, the information associated with a real credit card of the user is sent to a VR device of the cashier, but not a VR device of the friend. Responsive to receiving the information associated with the real credit card of the user, the VR device of the cashier transmits the information to a payment processing service, which in turn causes an amount to be charged from the credit card of the user and causes the charged amount to be deposited to an account associate with the cashier or the store.

In some embodiments, a first view of the virtual payment object is presented to the VR device associated with the user, a second view of the virtual payment object is presented to the VR device associated with the cashier, and a third view of the virtual payment object is presented to the VR device associated with the friend. In some embodiments, the first view or second view of the virtual payment object includes data describing the real payment object, and the third view of the virtual payment object does not include data describing the real payment object. As such, even though the friend is observing the interaction, the friend cannot see the payment information, while the cashier can visually verify the payment information, e.g., a name, a number, an expiration date, and an address associated with a real credit card.

Note, the examples described herein include selective real time communication of data describing real payment objects, although the embodiments are not limited to communication of data describing real payment objects. Other data describing personally identifiable information or sensitive user information may also be selectively communicated in near real time using the system or method described herein.

System Architecture

FIG. 1 is a block diagram of a system environment 100 for a virtual reality system 140. The system environment 100 shown by FIG. 1 comprises one or more client devices 110, a network 120, one or more third-party systems 130, and the virtual reality system 140. In alternative configurations, different and/or additional components may be included in the system environment 100. For example, the virtual reality system 140 may be a gaming system, a social media system, a marketplace system, or another system providing virtual experience to users.

The client devices 110 are one or more computing devices capable of receiving user input as well as transmitting and/or receiving data via the network 120. In one embodiment, a client device 110 is a virtual reality (VR) device, such as a headset, goggles, and/or a handset. In some embodiments, a client device 110 may also be a conventional computer system, such as a desktop or a laptop computer. Alternatively, a client device 110 may be a device having computer functionality, such as a personal digital assistant (PDA), a mobile telephone, a smartphone, or another suitable device.

A client device 110 is configured to communicate via the network 120. In one embodiment, a client device 110 executes an application allowing a user of the client device 110 to interact with the virtual reality system 140. For example, a client device 110 executes a browser application to enable interaction between the client device 110 and the virtual reality system 140 via the network 120. In another embodiment, a client device 110 interacts with the virtual reality system 140 through an application programming interface (API) running on a native operating system of the client device 110, such as WINDOWS®, IOS® or ANDROID™.

The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the virtual reality system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the virtual reality system 140, such as advertisements, content, or information about an application provided by the third party system 130.

Figure 2:
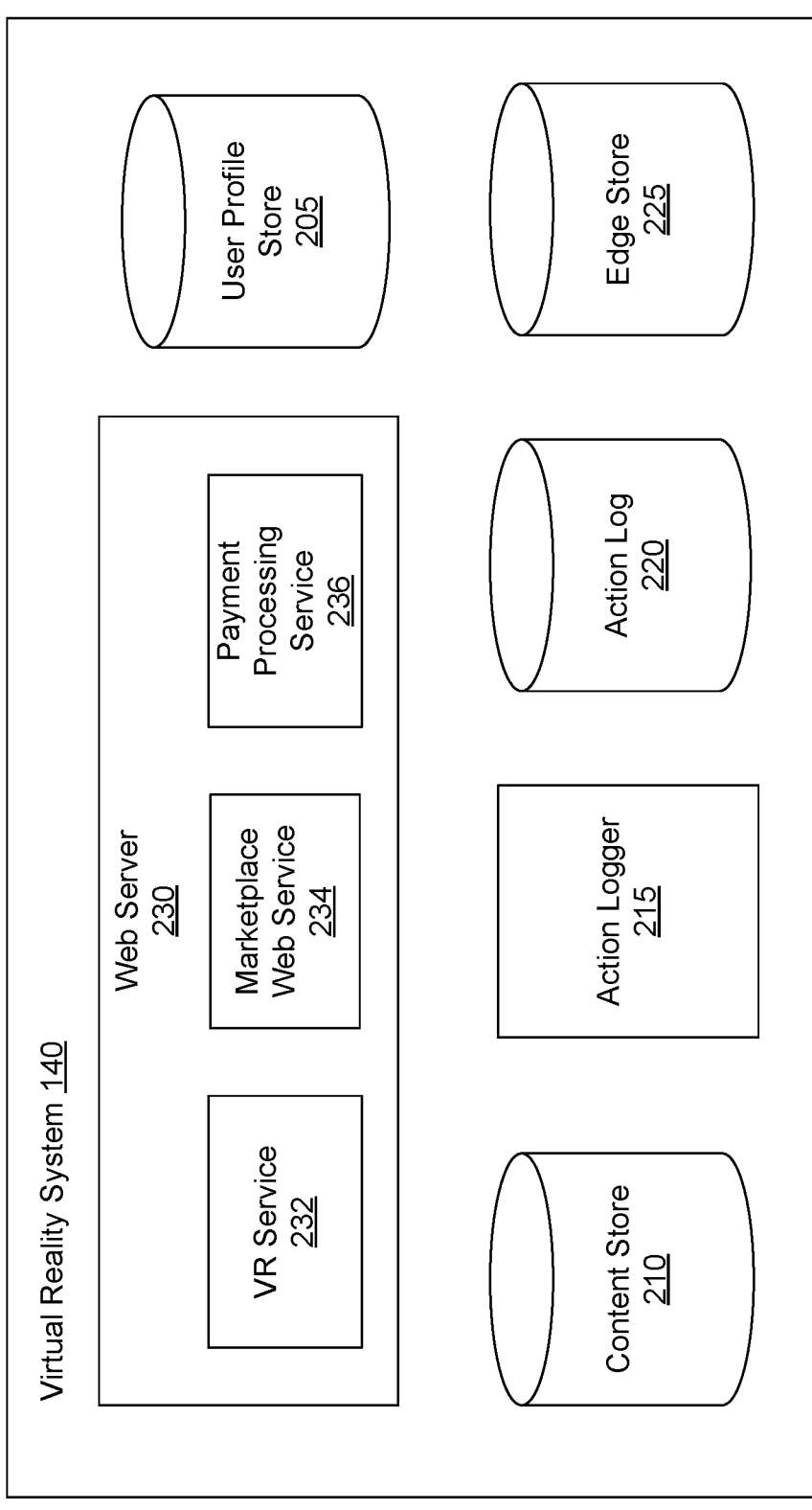
FIG. 2 is a block diagram of an architecture of the online system, in accordance with one or more embodiments.

FIG. 2 is a block diagram of an architecture of the virtual reality system 140. The virtual reality system 140 shown in FIG. 2 includes a web server 230, a user profile store 205, a content store 210, an action logger 215, an action log 220, and/or an edge store 225. In other embodiments, the virtual reality system 140 may include additional, fewer, or different components for various applications. Conventional components such as network interfaces, security functions, load balancers, failover servers, management and network operations consoles, and the like are not shown so as to not obscure the details of the system architecture.

The web server 230 links the virtual reality system 140 via the network 120 to the one or more client devices 110, as well as to the one or more third party systems 130. The web server 230 serves web pages, as well as other content, such as JAVA®, FLASH®, XML and so forth. The web server 230 may receive and route messages between the virtual reality system 140 and the client device 110, for example, instant messages, queued messages (e.g., email), text messages, short message service (SMS) messages, or messages sent using any other suitable messaging technique. A user may send a request to the web server 230 to upload information (e.g., images or videos) that are stored in the content store 210. Additionally, the web server 230 may provide application programming interface (API) functionality to send data directly to native client device operating systems, such as IOS®, ANDROID™, or BlackberryOS.

The web server 230 includes VR service 232, a marketplace web service 234, and a payment processing service 236. The VR service 232 is configured to present a virtual environment to users. A first user may be associated with a virtual payment object (e.g., a virtual credit card, and a second user may be associated with a virtual payment processing object (e.g., a card processor). The first user can provide the virtual payment object to the second user, allowing the virtual payment processing object to interact with the virtual payment object in the virtual environment. The virtual payment object corresponds to a real payment object of the first user. The virtual payment processing object corresponds to a real payment processing service (e.g., the payment processing service 236).

The marketplace web service 235 is configured to selectively forward data to different users, and enable real time communication of data associated with payment transaction. In some embodiments, responsive to detecting the interaction between the virtual payment processing object and the virtual payment object, the marketplace web service 235 receives data describing the real payment object from a client device of the first user (e.g., a VR device of the first user), and selectively forward the data to a client device of the second user (e.g., a VR device of the second user). The client device of the second user then causes the real payment processing service 236 to process a real payment from the real payment object to an account associated with the second user.

Each user of the virtual reality system 140 is associated with a user profile, which is stored in the user profile store 205. A user profile includes declarative information about the user that was explicitly shared by the user and may also include profile information inferred by the virtual reality system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the virtual reality system 140, user profiles may also be stored for entities such as businesses or organizations. This allows an entity to establish a presence on the virtual reality system 140 for connecting and exchanging content with other online system users. The entity may post information about itself, about its products or provide other information to users of the virtual reality system 140 using a brand page associated with the entity's user profile. Other users of the virtual reality system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the virtual reality system 140, events, groups or applications. In some embodiments, objects are received from third-party applications or third-party applications separate from the virtual reality system 140. In one embodiment, objects in the content store 210 represent single pieces of content, or content "items." Hence, online system users are encouraged to communicate with each other by posting text and content items of various types of media to the virtual reality system 140 through various communication channels. This increases the amount of interaction of users with each other and increases the frequency with which users interact within the virtual reality system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the virtual reality system 140 if content in the content item is presented to a user, if the content in the content item receives a user interaction when presented, or if any suitable condition is satisfied when content in the content item is presented to a user. For example, the bid amount included in a content item specifies a monetary amount that the virtual reality system 140 receives from a user who provided the content item to the virtual reality system 140 if content in the content item is displayed. In some embodiments, the expected value to the virtual reality system 140 of presenting the content from the content item may be determined by multiplying the bid amount by a probability of the content of the content item being accessed by a user.

In various embodiments, a content item includes various components capable of being identified and retrieved by the virtual reality system 140. Example components of a content item include: a title, text data, image data, audio data, video data, a landing page, a user associated with the content item, or any other suitable information. The virtual reality system 140 may retrieve one or more specific components of a content item for presentation in some embodiments. For example, the virtual reality system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the virtual reality system 140 logs interactions between users presented with the content item or with objects associated with the content item. Additionally, the virtual reality system 140 receives compensation from a user associated with content item as online system users perform interactions with a content item that satisfy the objective included in the content item.

Additionally, a content item may include one or more targeting criteria specified by the user who provided the content item to the virtual reality system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 includes multiple campaigns, which each include one or more content items. In various embodiments, a campaign in associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the virtual reality system 140 provides the virtual reality system 140 with various campaigns each including content items having different characteristics (e.g., associated with different content, including different types of content for presentation), and the campaigns are stored in the content store.

In one embodiment, targeting criteria may specify actions or types of connections between a user and another user or object of the virtual reality system 140. Targeting criteria may also specify interactions between a user and objects performed external to the virtual reality system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the virtual reality system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the virtual reality system 140 to track user actions on the virtual reality system 140, as well as actions on third party systems 130 that communicate information to the virtual reality system 140. Users may interact with various objects on the virtual reality system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the virtual reality system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the virtual reality system 140 as well as with other applications operating on the virtual reality system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the virtual reality system 140. For example, an e-commerce website may recognize a user of an virtual reality system 140 through a social plug-in enabling the e-commerce website to identify the user of the virtual reality system 140. Because users of the virtual reality system 140 are uniquely identifiable, e-commerce websites, such as in the preceding example, may communicate information about a user's actions outside of the virtual reality system 140 to the virtual reality system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the virtual reality system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the virtual reality system 140, such as expressing interest in a page on the virtual reality system 140, sharing a link with other users of the virtual reality system 140, and commenting on posts made by other users of the virtual reality system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the virtual reality system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the virtual reality system 140 over time to approximate a user's interest in an object or in another user in the virtual reality system 140 based on the actions performed by the user. A user's affinity may be computed by the virtual reality system 140 over time to approximate the user's interest in an object, in a topic, or in another user in the virtual reality system 140 based on actions performed by the user. Computation of affinity is further described in U.S. patent application Ser.

No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

Figure 3:
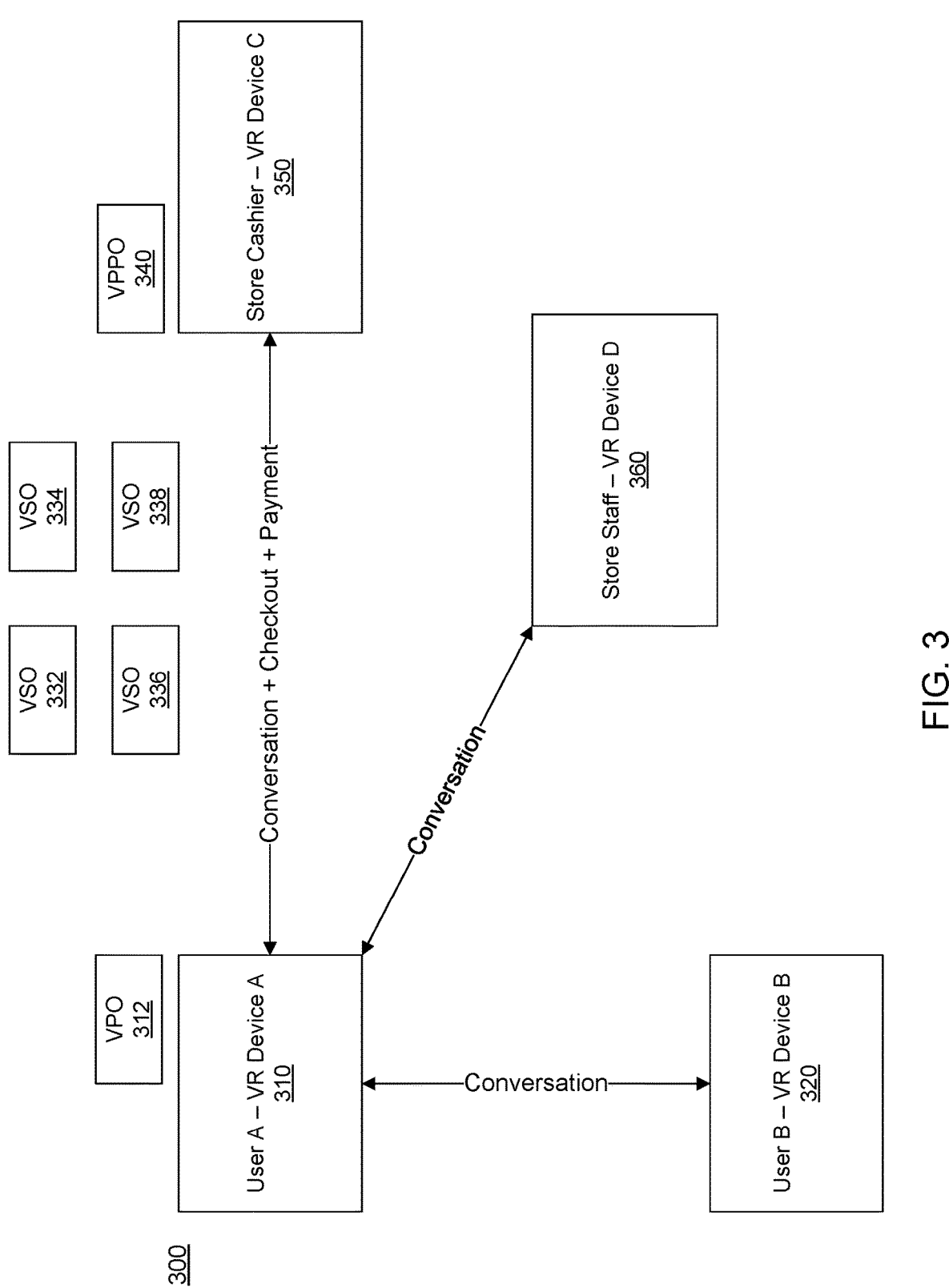
FIG. 3 illustrates an example virtual environment, in accordance with one or more embodiments.

FIG. 3 illustrates an example virtual environment 300 in accordance with one or more embodiments. The virtual environment 300 may be a virtual store that sells virtual shopping objects 332, 334, 336, 338. Multiple users are in the virtual store, including user A 310 (associated with VR device A), user B 320 (associated with VR device B), a store cashier (associated with VR device C), and a store staff member 360 (associated with VR device D). User A 310 has a virtual payment object 312 (e.g., a virtual credit card). The store cashier 350 has a virtual payment processing object 340 (e.g., a virtual card processor).

In the virtual environment 300, user A 310 and user B 320 may be friends, and they may have a conversation. The data associated with the conversation between users A and B are transmitted between VR device A and VR device B. User A 310 may also have a conversation with the store staff member 360. The data associated with the conversation between user A and store staff member 360 are transmitted between VR device A and VR device D.

When user A 310 decides to purchase a virtual shopping object 338, user A 310 would bring the virtual shopping object 338 and her payment processing object 312 to the store cashier 350. User A 310 and store cashier 350 may have a conversation about the purchase transaction in the virtual environment. The store cashier 350 may perform an action associated with the virtual payment object 312 and the virtual payment processing object 340, e.g., swiping a virtual credit card at the virtual card processor. Responsive to performing the action, the VR device A (associated with user A 310) transmits data describing the real payment object of the user A to VR device C (associated with the store cashier 350). After receiving the data describing the real payment object, the VR device C (associated with the store cashier 350) causes a real payment to be processed using the real payment object of user A 310.

In embodiments, the data transmissions among the VR devices A, B, C, and D are performed via a marketplace web service 235. The marketplace web service 235 receives multimedia data and data describing payment objects from VR devices associated with users, and selectively forwards portions of such data to VR devices associated with different users based on their interactions in the virtual environment.

Figure 4:
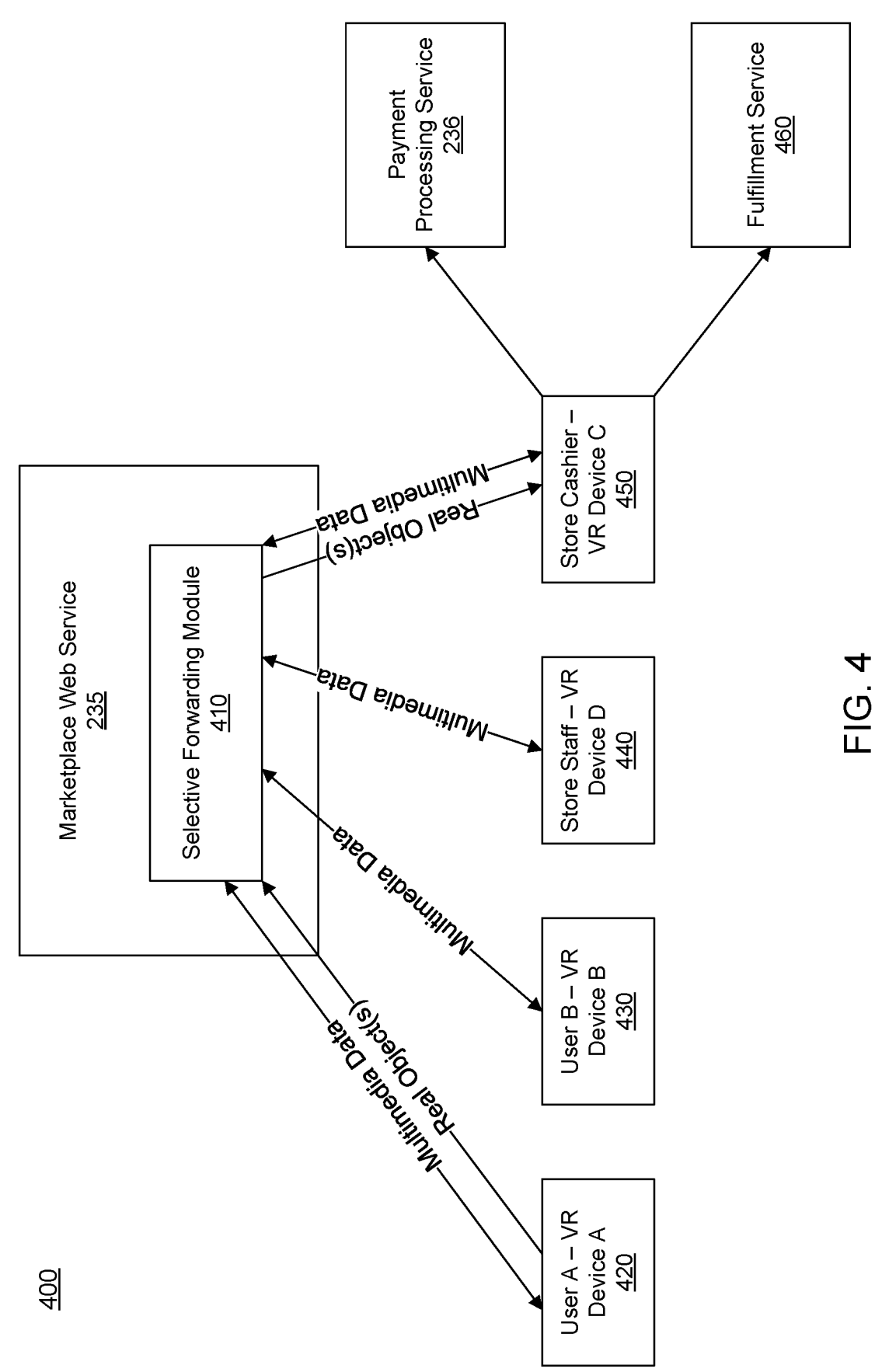
FIG. 4 illustrates an example communication pattern among marketplace web service and different VR devices, in accordance with one or more embodiments.

FIG. 4 illustrates an example communication pattern 400 among marketplace web service 235 and different VR devices A-D 420-450, in accordance with one or more embodiments. The marketplace web service 235 includes a selective forwarding module 410 configured to selectively forward portions of received data to one or more VR devices (associated with one or more other users). As illustrated, the market web service 235 receives from each of the VR devices A-D 420-460. The multimedia data may include (but is not limited to) images, video data, and/or audio data. The received multimedia data may be processed by the marketplace web service 235 based on the virtual environment currently being presented. The selectively forwarding module 410 selectively forwards portions of received multimedia data to one or more VR devices (associated with one or more other users). For example, when the user A is talking to user B in the VR environment, the selective forwarding module 410 forwards both video and audio data received from VR devices A and B to each other. However, VR device D (associated with store staff) and VR device C (associated with store cashier) may only receive video data but not audio data.

Further, when user A purchases a virtual shopping object in the virtual environment 300, the VR device A 420 transmits data describing real object(s), such as data describing the real payment object, the full name of user A, shipping address and billing address of user A, to the marketplace web service 235. The selective forwarding module 410 selectively forwards the data describing the real object(s) to VR device C 450 (associated with the cashier) based on the interaction between user A and store cashier in the virtual environment 300. After the VR device C 450 (associated with the store cashier) receives data describing the real object(s), it passes the real object(s) to the payment processing service 236, causing a real payment to be processed from the real payment object to an account associated with the store cashier or the store.

In some embodiments, the VR device C (associated with the store cashier) further passes some real object(s), such as a shipping address, to a fulfillment service 460, causing the fulfillment service 460 to fulfill an order corresponding to the virtual transaction. In some embodiments, in the virtual store, a virtual shopping object may correspond to a real shopping object. For example, a virtual shopping object may be a virtual T-shirt, corresponding to a real T-shirt. After the user purchases the virtual T-shirt in the virtual environment 300, the VR device C 450 sends data describing the real T-shirt and the shipping address of user A to the fulfillment service 460, causing the fulfilment service 460 to process the shipment of the real T-shirt to the shipping address of user A.

To provide an immersive experience to users that simulate real shopping experience, a real payment is to be made in near real time when the virtual transaction occurs. In embodiments, the data transmission among different devices is performed via a novel real time communication (RTC) protocol. The RTC protocol is configured to transmit data describing a real payment object from a VR device associated with a buyer to an online system, which in turn passes the real payment object to a VR device associated with a cashier. The VR device associated with the cashier can parse the data describing the real payment object to perform the real payment transaction.

As illustrated in FIG. 1, communications among different client devices 110 and virtual reality system 140 are performed via a computer network 120. In general, a computer network includes multiple layers. When data is to be transmitted from a first device to a second device, the data is in a format that is usable by an application. During transmission of the data, the data is repackaged in each layer, until the data is in a format that can be transmitted by the physical media of the network 120, e.g., physical cable or radio wave. When the data arrives at the second device, the data is in the format of the lowest layer that the physical media can receive it. The data in the lowest format needs to be extracted and reconstructed to data packages in the form of the highest layer, which can then be usable by applications.

The packaging and reconstruction of data in different layers increase communication latency. In some embodiments, to reduce communication latency, the selective forwarding module 410 is implemented at a layer of the computer network 120 that is lower than an application layer, such that less packaging and reconstruction of data is required before the data are selectively forwarded to other client devices 110.

Figure 5:
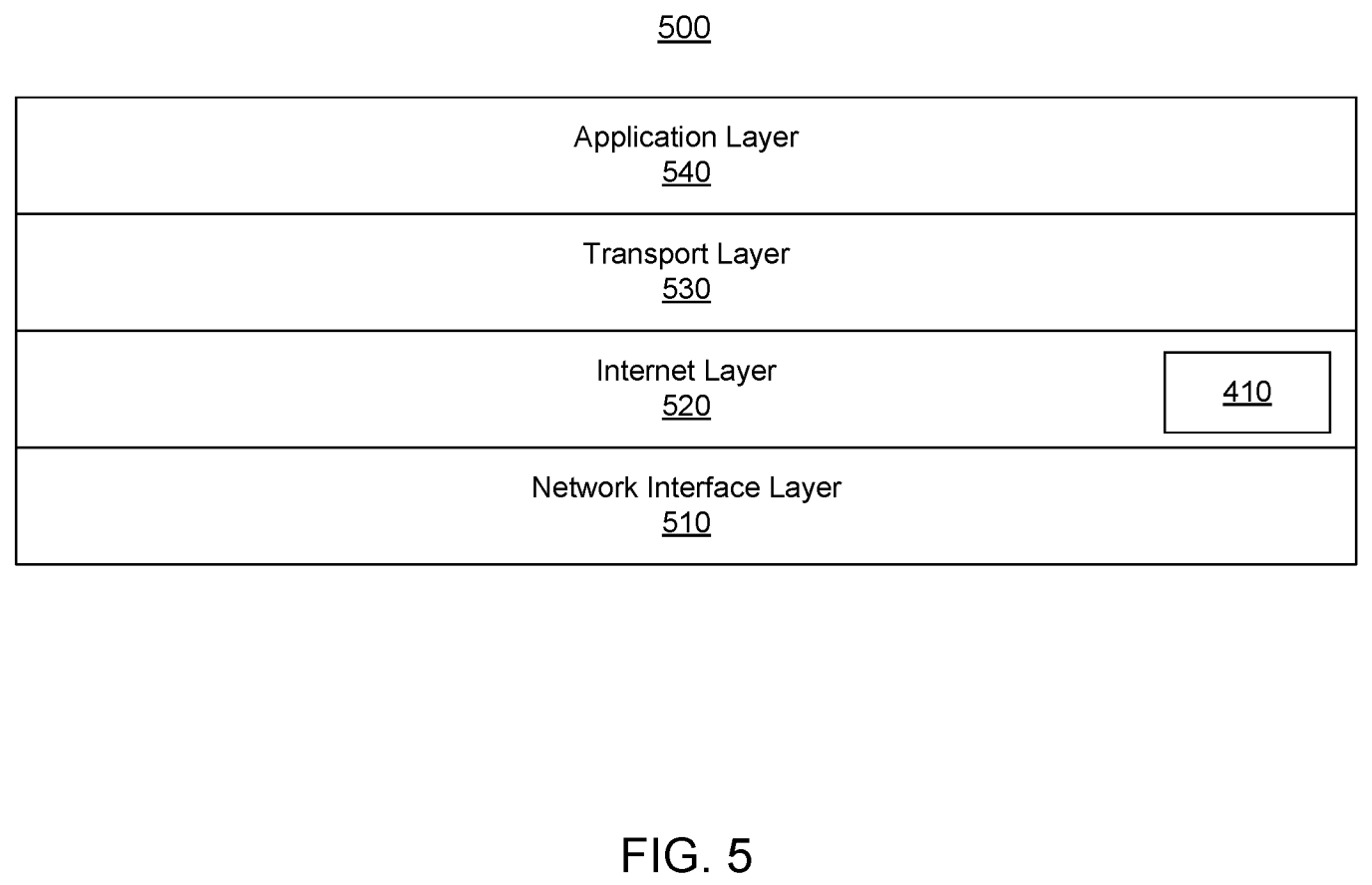

For example, FIG. 5 illustrates an example of a TCP/IP model 500, including a network interface layer 510, an internet layer 520, a transport layer 530, and an application layer 540. The network interface layer 510 is responsible for the transmission between two devices on a same network. The internet layer 520 is responsible to move packets from source to destination, and to provide internetworking. The transport layer 530 is to provide reliable process to process message delivery and error delivery. The application layer 540 allows access to network resources. The internet layer 520 is the lowest layer that the selective forwarding module 410 may be implemented to minimize the communication latency. In some embodiments, the selective forwarding module 410 is implemented in the internet layer 520. Alternatively, the selective forwarding module 410 is implemented in the transport layer 530. In some embodiments, the selective forwarding module 410 is implemented in the network interface layer 510 when two client devices are on a same network.

As another example, the open system interconnection (OSI) model describes seven layers that client devices use to communicate over a network. The seven layers include a physical layer, a data link layer, a network layer, a transport layer, a session layer, a presentation layer, and an application layer. The physical layer transmits raw bit stream over the physical medium. The data link layer defines the format of data on the network. The network layer decides which physical path the data will take. The transport layer transmits data using transmission protocols including TCP and UDP. The session layer maintains connections and is responsible for controlling ports and sessions. The presentation layer ensures that data is in a usable format and is where data encryption occurs. The application layer is a human-computer interaction layer, where applications can access the network services. In the OSI model, the network layer, transport layer, or a session layer may be where the selective forwarding module 410 may be implemented to minimize the communication latency. In some embodiments, the selective forwarding module 410 is implemented in the network layer to minimize latency.

In some embodiments, each data packet, in the layer of network where the selective forwarding module 410 is implemented, includes a field indicating whether the data packet containing data describing a real payment object. The selective forwarding module 410 selectively forwards the data packets based on values in the field. For example, the selective forwarding module 410 determines whether a data packet contains data describing a real payment object based on a value in the field of the data packet. Responsive to determining that the data packet does not contain data describing any real payment object, the selective forwarding module 410 forwards the data to all the VR devices in the virtual environment. On the other hand, responsive to determining that the data packet contains data describing any real payment object, the selective forwarding module 410 only forwards the data packet to a VR device associated with a virtual payment processing object. Since the selective forwarding module 410 is implemented in a particular layer of the network that is below the application layer 540, the data packets do not need to be reconstructed at the application layer at the selective forwarding module 410, and the selective forwarding module 410 can forward the data packets directly in the particular layer to other VR devices, reducing the latency of data transmission.

Example Method for Selective Real-Time Communication in a Virtual Environment

FIG. 6 is a flowchart of one embodiment of a method 600 for real time communication in a virtual environment. In various embodiments, the method includes different or additional steps than those described in conjunction with FIG. 6. Further, in some embodiments, the steps of the method may be performed in different orders than the order described in conjunction with FIG. 6. The method 600 described in conjunction with FIG. 6 may be carried out by the virtual reality system 140 in various embodiments, while in other embodiments, the steps of the method are performed by any online system capable of real time communication.

The virtual reality system 140 presents 610 a virtual environment to a plurality of users. Each of the plurality of users is associated with a client device. In some embodiments, the client device is a VR device that provides a user with an immersive experience as if the user is physically in the virtual environment. For example, in some embodiments, the virtual environment may include a virtual shop, and the plurality of users may be shoppers in the virtual shop, or staff members of the shop, such as a cashier, a salesperson, etc.

The virtual reality system 140 presents 620, in the virtual environment, a virtual payment object associated with a first user of the plurality of users. The virtual payment object may be (but is not limited to) a virtual credit card, virtual debit card, a virtual check, a virtual coupon, etc. The first user may be a shopper of a virtual store in the virtual environment. The virtual reality system 140 presents 630, in the virtual environment, a virtual payment processing object associated with a second user of the plurality of users. For example, the virtual payment processing object may be a virtual card processor. The second user may be a cashier of the virtual store in the virtual environment.

The virtual reality system 140 associates 640 the virtual payment object with a real payment object. For example, a virtual credit card may be associated with a real credit card of the first user, a virtual debit card may be associated with a real debit card of the first user. The virtual reality system 140 associates 650 the payment processing object with a real payment processing service. For example, the real payment service may be able to process credit card payments, debit card payments, process checks via an ACH network, give a discounted price to a user responsive to receiving a coupon, etc.

The first user may decide to purchase a virtual shopping object in the virtual shop, and brings her virtual payment object (e.g., virtual credit card) to the cashier, and the cashier performs an action causing the virtual payment object to interact with the virtual payment processing object (e.g., swiping the virtual credit card at the virtual card processor). The virtual reality system 140 detects 660 the interaction in the virtual reality environment between the virtual payment object and the virtual payment processing object. Responsive to the detecting the interaction between the virtual payment object and the virtual payment processing object, the virtual reality system 140 transmits 670 data describing the real payment object to the real payment processing service via a real time communication protocol, causing the real payment processing service to process a real payment from the real payment object to an account associated with the second user. The real time communication protocol allows data communication among client devices associated with users of the virtual environment with low latency. In some embodiments, the real-time communication protocol is implemented in a particular layer of network that is below an application layer, such that data packets in the particular layer does not need to be packaged or reconstructed in the application layer at the virtual reality system 140.

FIG. 7 is a flowchart of one embodiment of a method 700 for transmitting data describing a real payment object to the real processing service via a real time communication protocol, which may correspond to the step 670 of method 600. In various embodiments, the method 700 includes different or additional steps than those described in conjunction with FIG. 7.

The virtual reality system 140 receives 710, via a real communication protocol, multimedia data, and data describing the real payment object from a first VR device associated with the first user. The multimedia data may include (but are not limited to) video data, audio data, head motion data, hand motion data, etc. For example, the first user is a shopper of a virtual shop in the virtual environment. The first user may be communicating with a second user (who may be a cashier of the virtual shop) and a third user (who may be a friend of the first user). The communication data is multimedia data, including (but not limited to) video data and/or audio data. Such communication data is transmitted from VR devices associated with the first user, second user, and/or third user to the virtual reality system. When the first user decides to purchase a virtual shopping object, and provides her virtual payment object to the cashier of the virtual shop, the first VR device associated with the first user also transmits data describing a real payment object (corresponding to the virtual payment object) to the virtual reality system 140.

Responsive to receiving the multimedia data and data describing the real payment object, the virtual reality system 140 selective forwards 720, via the real communication protocol, the multimedia data or the data describing the real payment object to a plurality of VR devices associated with a plurality of users, e.g., the second user (e.g., the cashier), the third user (e.g., the friend of the first user). In some embodiments, selective forwarding 720 includes forwarding 722 a first portion of the multimedia data and the data describing the real payment object to a second VR device associated with the second user (e.g., the cashier) based on interactions between the first user and the second user in the virtual environment. In some embodiments, selecting forwarding 720 includes forwarding 724 a second portion of multimedia data without the data describing the real payment object to a third VR device associated with a third user (e.g., the friend of the first user) based on interactions between the first user and the third user in the virtual environment.

In some embodiments, each data packet includes a field indicating whether that data packet contains data describing a real object, such as a real payment object, or real personally identifiable object. When the virtual reality system 140 receives the data packet, it parses the data packet to determine whether the data describes a real object based on a value of the field of the data packet. Responsive to determining that the data packet contains data describing a real object, the virtual reality system 140 selectively forwards that data packet to a client device associated with a proper user that is intended to receive data describing such a real object.

In some embodiments, the virtual reality system 140 causes 730 the first VR device to display the virtual payment object in a first view, causes 740 the second VR device to display the virtual payment object in a second view, and/or causes 750 the third VR device to display the virtual payment object in a third view. The first view or the second view of the virtual payment object may show some or all data describing the real payment object. The third view of the virtual payment does not show any data describing the real payment object.

For example, the second user may be a cashier, and the second view may show a real credit card number and a name of the credit card holder, as if the cashier receives a real credit card in a real environment. The cashier can verify the number of the credit card and type the verification code at the virtual payment processing object, or verify the name of the credit card holder. The third user may be a friend of the first user, accompanying the first user shopping at a virtual store. The third user should not have the information about the first user's real payment object. In some embodiments, the third user may see a virtual object with some arbitrary image or text displayed at where real information may be displayed.

Note, the examples described herein include selective real time communication of data describing real payment objects, although the embodiments are not limited to communication of data describing real payment objects. Other data describing personally identifiable information or sensitive information may also be selectively communicated using the system or method described herein.

Example Embodiments of VR Devices

Figure 8A:
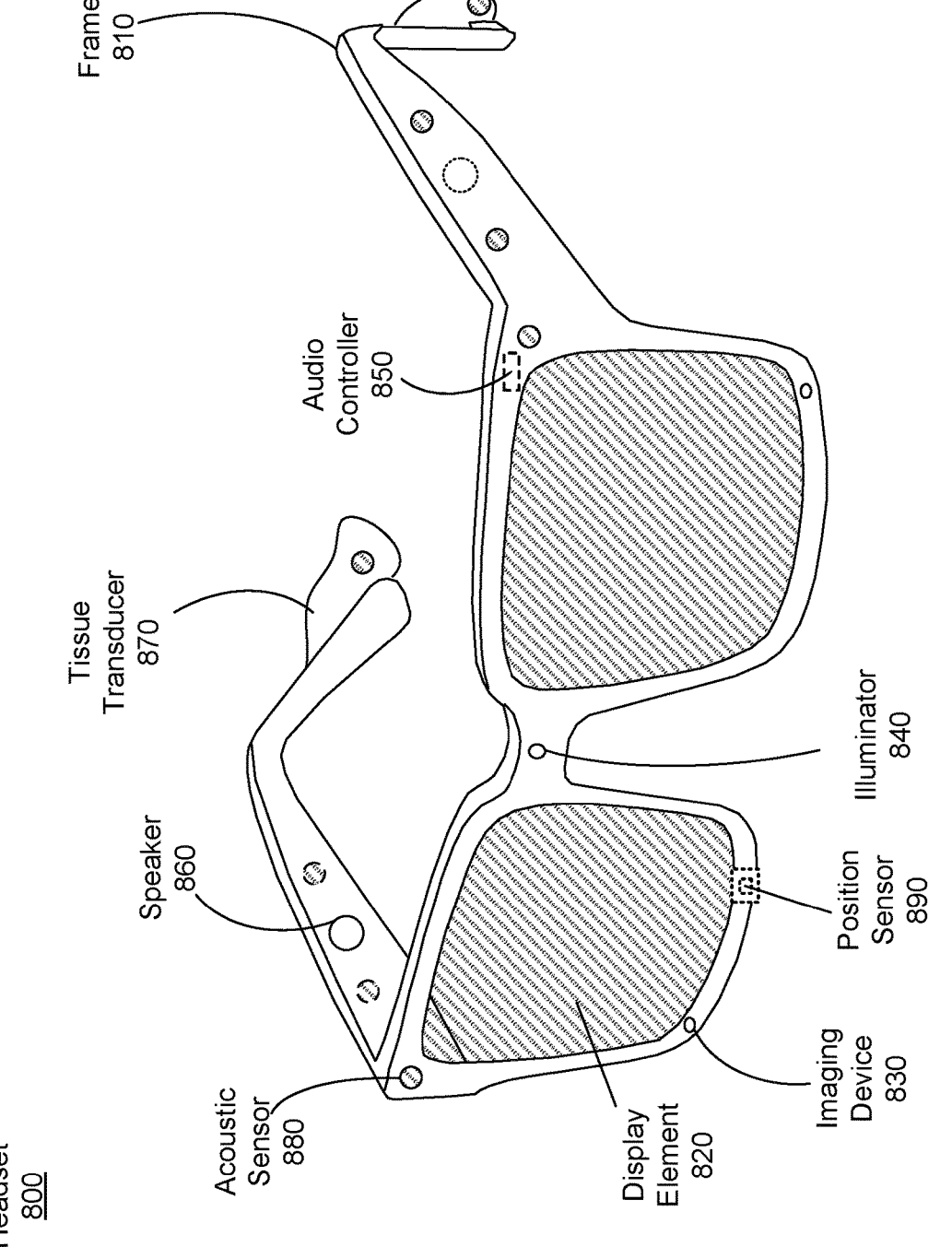
FIG. 8A is a perspective view of a virtual reality (VR) headset implemented as an eyewear device, in accordance with one or more embodiments.
Figure 8B:
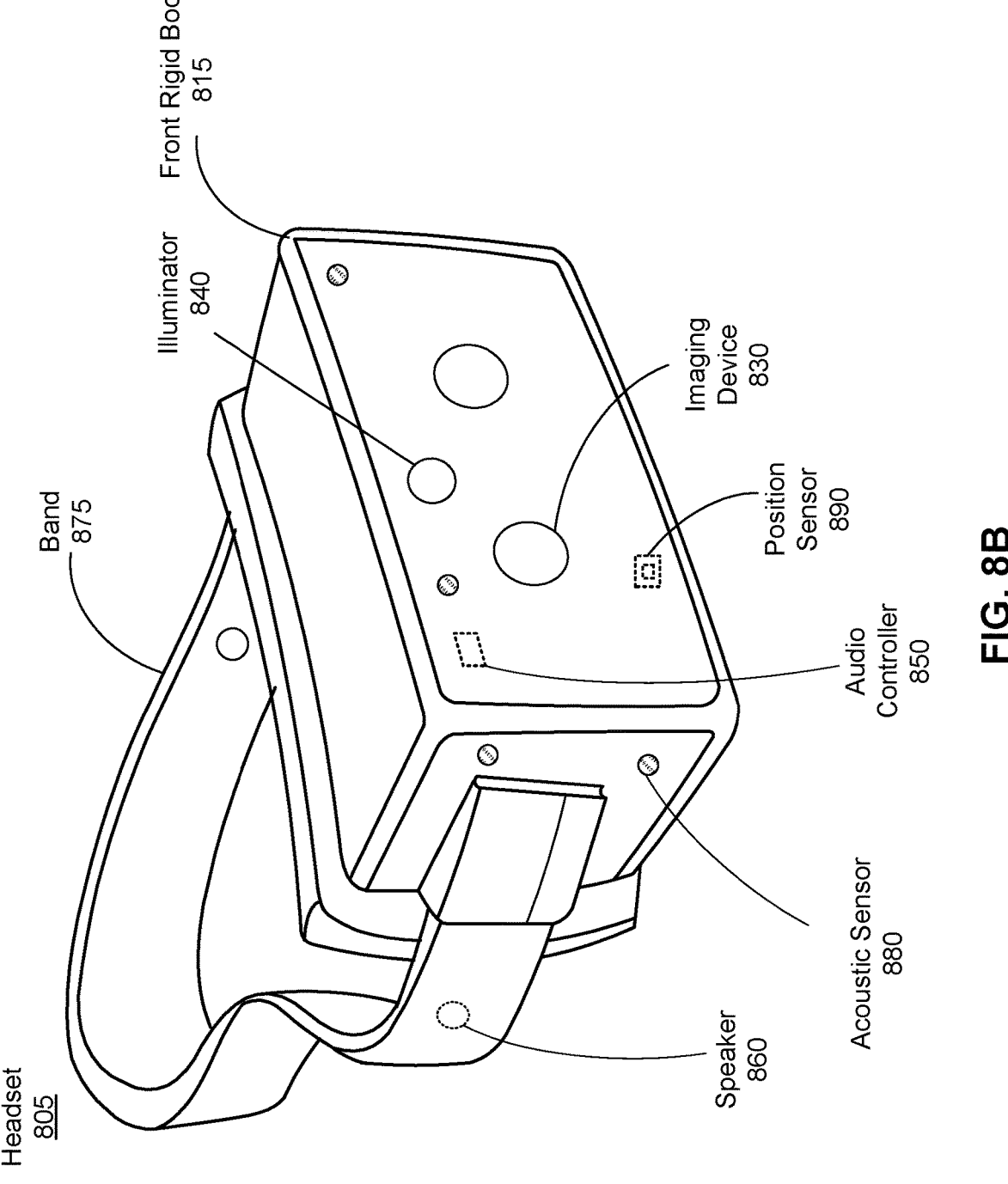
FIG. 8B is a perspective view of a VR headset implemented as a head-mounted device (HMD), in accordance with one or more embodiments.

As described above, a user in the virtual environment may be wearing a VR headset to experience the immersive experience of the virtual environment. FIGS. 8A and 8B illustrate example VR headsets 800 and 805, in accordance to one or more embodiments.

FIG. 8A is a perspective view of a VR headset 800 implemented as an eyewear device, in accordance with one or more embodiments. In some embodiments, the eyewear device is a near eye display (NED). In general, the headset 800 may be worn on the face of a user such that content (e.g., media content) is presented using a display assembly and/or an audio system. However, the headset 800 may also be used such that media content is presented to a user in a different manner. Examples of media content presented by the headset 800 include one or more images, video, audio, or some combination thereof. The headset 800 includes a frame, and may include, among other components, a display assembly including one or more display elements 820, a depth camera assembly (DCA), an audio system, and a position sensor 890. While FIG. 8A illustrates the components of the headset 800 in example locations on the headset 800, the components may be located elsewhere on the headset 800, on a peripheral device paired with the headset 800, or some combination thereof. Similarly, there may be more or fewer components on the headset 800 than what is shown in FIG. 8A.

The frame 810 holds the other components of the headset 800. The frame 810 includes a front part that holds the one or more display elements 820 and end pieces (e.g., temples) to attach to a head of the user. The front part of the frame 810 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 820 provide light to a user wearing the headset 800. As illustrated the headset includes a display element 820 for each eye of a user. In some embodiments, a display element 820 generates image light that is provided to an eyebox of the headset 800. The eyebox is a location in space that an eye of user occupies while wearing the headset 800. For example, a display element 820 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 800. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 820 are opaque and do not transmit light from a local area around the headset 800. The local area is the area surrounding the headset 800. For example, the local area may be a room that a user wearing the headset 800 is inside, or the user wearing the headset 800 may be outside and the local area is an outside area. In this context, the headset 800 generates VR content. Alternatively, in some embodiments, one or both of the display elements 820 are at least partially transparent, such that light from the local area may be combined with light from the one or more display elements to produce AR and/or MR content.

In some embodiments, a display element 820 does not generate image light, and instead is a lens that transmits light from the local area to the eyebox. For example, one or both of the display elements 820 may be a lens without correction (non-prescription) or a prescription lens (e.g., single vision, bifocal and trifocal, or progressive) to help correct for defects in a user's eyesight. In some embodiments, the display element 820 may be polarized and/or tinted to protect the user's eyes from the sun.

In some embodiments, the display element 820 may include an additional optics block (not shown). The optics block may include one or more optical elements (e.g., lens, Fresnel lens, etc.) that direct light from the display element 820 to the eyebox. The optics block may, e.g., correct for aberrations in some or all of the image content, magnify some or all of the image, or some combination thereof.

The DCA determines depth information for a portion of a local area surrounding the headset 800. The DCA includes one or more imaging devices 830 and a DCA controller (not shown in FIG. 8A), and may also include an illuminator 840. In some embodiments, the illuminator 840 illuminates a portion of the local area with light. The light may be, e.g., structured light (e.g., dot pattern, bars, etc.) in the infrared (IR), IR flash for time-of-flight, etc. In some embodiments, the one or more imaging devices 830 capture images of the portion of the local area that include the light from the illuminator 840. As illustrated, FIG. 8A shows a single illuminator 840 and two imaging devices 830. In alternate embodiments, there is no illuminator 840 and at least two imaging devices 830.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 840), some other technique to determine depth of a scene, or some combination thereof.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. The headset 800 may prompt the user to opt in to allow operation of the eye tracking unit. For example, by opting in the headset 800 may detect, store, images of the user's any or eye tracking information of the user.

The audio system provides audio content. The audio system includes a transducer array, a sensor array, and an audio controller 850. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 860 or a tissue transducer 870 (e.g., a bone conduction transducer or a cartilage conduction transducer). Although the speakers 860 are shown exterior to the frame 810, the speakers 860 may be enclosed in the frame 810. In some embodiments, instead of individual speakers for each ear, the headset 800 includes a speaker array comprising multiple speakers integrated into the frame 810 to improve directionality of presented audio content. The tissue transducer 870 couples to the head of the user and directly vibrates tissue (e.g., bone or cartilage) of the user to generate sound. The number and/or locations of transducers may be different from what is shown in FIG. 8A.

The sensor array detects sounds within the local area of the headset 800. The sensor array includes a plurality of acoustic sensors 880. An acoustic sensor 880 captures sounds emitted from one or more sound sources in the local area (e.g., a room). Each acoustic sensor is configured to detect sound and convert the detected sound into an electronic format (analog or digital). The acoustic sensors 880 may be acoustic wave sensors, microphones, sound transducers, or similar sensors that are suitable for detecting sounds.

In some embodiments, one or more acoustic sensors 880 may be placed in an ear canal of each ear (e.g., acting as binaural microphones). In some embodiments, the acoustic sensors 880 may be placed on an exterior surface of the headset 800, placed on an interior surface of the headset 800, separate from the headset 800 (e.g., part of some other device), or some combination thereof. The number and/or locations of acoustic sensors 880 may be different from what is shown in FIG. 8A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 800.

The audio controller 850 processes information from the sensor array that describes sounds detected by the sensor array. The audio controller 850 may comprise a processor and a computer-readable storage medium. The audio controller 850 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 860, or some combination thereof.

The position sensor 890 generates one or more measurement signals in response to motion of the headset 800. The position sensor 890 may be located on a portion of the frame 810 of the headset 800. The position sensor 890 may include an inertial measurement unit (IMU). Examples of position sensor 890 include: one or more accelerometers, one or more gyroscopes, one or more magnetometers, another suitable type of sensor that detects motion, a type of sensor used for error correction of the IMU, or some combination thereof. The position sensor 890 may be located external to the IMU, internal to the IMU, or some combination thereof.

In some embodiments, the headset 800 may provide for simultaneous localization and mapping (SLAM) for a position of the headset 800 and updating of a model of the local area. For example, the headset 800 may include a passive camera assembly (PCA) that generates color image data. The PCA may include one or more RGB cameras that capture images of some or all of the local area. In some embodiments, some or all of the imaging devices 830 of the DCA may also function as the PCA. The images captured by the PCA and the depth information determined by the DCA may be used to determine parameters of the local area, generate a model of the local area, update a model of the local area, or some combination thereof. Furthermore, the position sensor 890 tracks the position (e.g., location and pose) of the headset 800 within the room.

FIG. 8B is a perspective view of a headset 805 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 815 and a band 875. The headset 805 includes many of the same components described above with reference to FIG. 8A, but modified to integrate with the HMD form factor. For example, the HMD includes a display assembly, a DCA, an audio system, and a position sensor 890. FIG. 8B shows the illuminator 840, a plurality of the speakers 860, a plurality of the imaging devices 830, a plurality of acoustic sensors 880, and the position sensor 890. The speakers 860 may be located in various locations, such as coupled to the band 875 (as shown), coupled to front rigid body 815, or may be configured to be inserted within the ear canal of a user.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
presenting a virtual environment to a plurality of users of a virtual reality system;
presenting, in the virtual environment, a virtual payment object associated with a first user of the plurality of users;
presenting, in the virtual environment, a virtual payment processing object associated with a second user of the plurality of users, wherein the virtual payment object is configured to interact with the virtual payment processing object to initiate a real payment;

associating the virtual payment object with a real payment object;
associating the virtual payment processing object with a real payment processing service;
detecting an interaction in the virtual environment between the virtual payment object and the virtual payment processing object; and
responsive to detection of the interaction between the virtual payment object and the virtual payment processing object;
receiving, via a real time communication (RTC) protocol, multimedia data and data describing the real payment object from a first VR device associated with the first user,
selectively forwarding, via the RTC protocol and in a particular layer of a network that is below an application layer of the network, the multimedia data or the data describing the real payment object to a plurality of VR devices associated with a plurality of users, wherein a field in each data packet in the particular layer of the network indicates whether the data packet contains data describing a real payment object, and
causing the real payment processing service to process a real payment from the real payment object associated with the first user to an account associated with the second user in near real time.

2. The method of claim 1, further comprising:
receiving, via the RTC protocol, the data describing the real payment object from a first VR device associated with the first user; and
forwarding, via the RTC protocol, the data describing the real payment object to a second VR device associated with the second user based on the interaction between the virtual payment object associated with the first user and the virtual payment processing object in the virtual environment, causing the second VR device to transmit the data describing the real payment object to the real payment processing service to process the real payment.

3. The method of claim 1, wherein selectively forwarding the multimedia data or the data describing the real payment object to a plurality of VR devices associated with a plurality of users comprises:
forwarding, via the RTC protocol, a first portion of the multimedia data and the data describing the real payment object to a second VR device associated with the second user based on interactions between the first user and the second user in the virtual environment; and
forwarding, via the RTC protocol, a second portion of multimedia data without the data describing the real payment object to a third VR device associated with a third user based on interactions between the first user and the third user in the virtual environment.

4. The method of claim 3, wherein a first view of the virtual payment object is presented to the first VR device associated with the first user, a second view of the virtual payment object is presented to the second VR device associated with the second user, and a third view of the virtual payment object is presented to the third VR device associated with the third user.

5. The method of claim 4, wherein the first view or second view of the virtual payment object includes data describing the real payment object, and the third view of the virtual payment object does not include data describing the real payment object.

6. The method of claim 1, wherein selectively forwarding the multimedia data or the data describing the real payment object in the particular layer of the network is performed based on fields in data packets in the particular layer.

7. The method of claim 6, wherein selective forwarding the multimedia data or the data describing the real payment object is performed based on the field in each data packet.

8. The method of claim 7, wherein selective forwarding the multimedia data or the data describing the real payment object comprises prioritizing data packets that contain data describing a real payment object over data packets that contain multimedia data.

9. A computer program product comprising a non-transitory computer-readable storage medium having instructions encoded there on that, when executed by a processor, cause the processor to perform steps comprising:

presenting a virtual environment to a plurality of users of a virtual reality system;

presenting, in the virtual environment, a virtual payment object associated with a first user of the plurality of users;

presenting, in the virtual environment, a virtual payment processing object associated with a second user of the plurality of users, wherein the virtual payment object is configured to interact with the virtual payment processing object to initiate a real payment;

associating the virtual payment object with a real payment object;

associating the virtual payment processing object with a real payment processing service;

detecting an interaction in the virtual environment between the virtual payment object and the virtual payment processing object; and responsive to detection of the interaction between the virtual payment object and the virtual payment processing object;

receiving, via a real time communication (RTC) protocol, multimedia data and data describing the real payment object from a first VR device associated with the first user, selectively forwarding, via the RTC protocol and in a particular layer of a network that is below an application layer of the network, the multimedia data or the data describing the real payment object to a plurality of VR devices associated with a plurality of users, wherein a field in each data packet in the particular layer of the network indicates whether the data packet contains data describing a real payment object, and causing the real payment processing service to process a real payment from the real payment object associated with the first user to an account associated with the second user in near real time.

10. The computer program product of claim 9, further comprising:

receiving, via the RTC protocol, the data describing the real payment object from a first VR device associated with the first user; and forwarding, via the RTC protocol, the data describing the real payment object to a second VR device associated with the second user based on the interaction between the virtual payment object associated with the first user and the virtual payment processing object in the virtual environment, causing the second VR device to transmit the data describing the real payment object to the real payment processing service to process the real payment.

11. The computer program product of claim 9, wherein selectively forwarding the multimedia data or the data describing the real payment object to a plurality of VR devices associated with a plurality of users comprises:

forwarding, via the RTC protocol, a first portion of the multimedia data and the data describing the real payment object to a second VR device associated with the second user based on interactions between the first user and the second user in the virtual environment; and forwarding, via the RTC protocol, a second portion of multimedia data without the data describing the real payment object to a third VR device associated with a third user based on interactions between the first user and the third user in the virtual environment.

12. The computer program product of claim 11, wherein a first view of the virtual payment object is presented to the first VR device associated with the first user, a second view of the virtual payment object is presented to the second VR device associated with the second user, and a third view of the virtual payment object is presented to the third VR device associated with the third user.

13. The computer program product of claim 12, wherein the first view or second view of the virtual payment object includes data describing the real payment object, and the third view of the virtual payment object does not include data describing the real payment object.

14. The computer program product of claim 9, wherein selectively forwarding the multimedia data or the data describing the real payment object in the particular layer of the network is performed based on fields in data packets in the particular layer.

15. The computer program product of claim 14, wherein selective forwarding the multimedia data or the data describing the real payment object is performed based on the field in each data packet.

16. A computer system comprising:

a processor; and a non-transitory computer-readable medium having instructions encoded thereon that, when executed by the processor, cause the processor to perform steps comprising:

presenting a virtual environment to a plurality of users of a virtual reality system;

presenting, in the virtual environment, a virtual payment object associated with a first user of the plurality of users;

presenting, in the virtual environment, a virtual payment processing object associated with a second user of the plurality of users, wherein the virtual payment object is configured to interact with the virtual payment processing object to initiate a real payment;

associating the virtual payment object with a real payment object;

associating the virtual payment processing object with a real payment processing service;

detecting an interaction in the virtual environment between the virtual payment object and the virtual payment processing object; and responsive to detection of the interaction between the virtual payment object and the virtual payment processing object;

receiving, via a real time communication (RTC) protocol, multimedia data and data describing the real payment object from a first VR device associated with the first user, selectively forwarding, via the RTC protocol and in a particular layer of a network that is below an application layer of the network, the multimedia data or the data describing the real payment object to a plurality of VR devices associated with a plurality of users, wherein a field in each data packet in the particular layer of the network indicates whether the data packet contains data describing a real payment object, and causing the real payment processing service to process a real payment from the real payment object associated with the first user to an account associated with the second user in near real time.

* * * * *